United States Patent
Hackenberg et al.

(10) Patent No.: US 9,293,762 B2
(45) Date of Patent: Mar. 22, 2016

(54) ANODE MATERIAL INCLUDING NANOFIBERS FOR A LITHIUM ION CELL

(75) Inventors: Juergen Hackenberg, Sachsenheim (DE); Benjamin Walther, Erfurt (DE); Ingo Zeitler, Tamm (DE); Ulrike Mock, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 283 days.

(21) Appl. No.: 13/989,511

(22) PCT Filed: Oct. 6, 2011

(86) PCT No.: PCT/EP2011/067436
§ 371 (c)(1),
(2), (4) Date: Aug. 5, 2013

(87) PCT Pub. No.: WO2012/069245
PCT Pub. Date: May 31, 2012

(65) Prior Publication Data
US 2013/0316236 A1    Nov. 28, 2013

(30) Foreign Application Priority Data
Nov. 26, 2010    (DE) .................. 10 2010 062 006

(51) Int. Cl.
| | |
|---|---|
| *H01M 4/36* | (2006.01) |
| *H01M 4/134* | (2010.01) |
| *H01M 4/1395* | (2010.01) |
| *H01M 4/38* | (2006.01) |
| *H01M 10/0525* | (2010.01) |

(52) U.S. Cl.
CPC .............. *H01M 4/362* (2013.01); *H01M 4/134* (2013.01); *H01M 4/1395* (2013.01); *H01M 4/38* (2013.01); *H01M 10/0525* (2013.01); *Y02E 60/122* (2013.01)

(58) Field of Classification Search
CPC ... H01M 4/362; H01M 4/134; H01M 4/1395; H01M 4/38; H01M 4/387
USPC .......................................................... 429/213
See application file for complete search history.

(56) References Cited

U.S. PATENT DOCUMENTS

| | | | |
|---|---|---|---|
| 2008/0261116 A1* | 10/2008 | Burton et al. .............. | 429/231.8 |
| 2009/0176159 A1* | 7/2009 | Zhamu et al. ............... | 429/222 |
| 2009/0186267 A1 | 7/2009 | Tiegs | |

FOREIGN PATENT DOCUMENTS

| | | |
|---|---|---|
| CN | 101808819 | 8/2010 |
| DE | 10 2006 013 484 | 9/2007 |
| JP | 2005203365 | 7/2005 |
| JP | 2007-42602 | 2/2007 |
| JP | 2007042602 | 2/2007 |
| JP | 2007-171207 | 7/2007 |
| JP | 2008181879 | 8/2008 |
| JP | 2008269827 | 11/2008 |
| JP | 2009-235629 | 10/2009 |
| JP | 2010080419 | 4/2010 |
| JP | 2010-262754 | 11/2010 |
| WO | 2009/033015 | 3/2009 |

* cited by examiner

*Primary Examiner* — Stewart Fraser
(74) *Attorney, Agent, or Firm* — Kenyon & Kenyon LLP

(57) ABSTRACT

An anode material for a galvanic element, in particular a lithium-ion cell. To improve the current density and thermal stability of galvanic elements, the anode material includes nanofibers made of a metal, a metal alloy, a carbon-metal oxide composite material, a carbon-metal alloy composite material, a conductive polymer, a polymer-metal composite material, a polymer-metal alloy composite material or a combination thereof. The nanofibers may be in the form a nanofiber netting, a nonwoven and/or a network and may be connected to a current conductor.

15 Claims, 2 Drawing Sheets

ANODE MATERIAL INCLUDING NANOFIBERS FOR A LITHIUM ION CELL

FIELD OF THE INVENTION

The present invention relates to an anode material, a galvanic element and a method for manufacturing the same.

BACKGROUND INFORMATION

Lithium ion cells available commercially at the present time usually have graphite anodes capable of reversibly inserting and disinserting lithium during the charging and discharging operation. However, the maximum capacity of graphite is limited due to the maximum insertable amount of lithium and is approximately 370 mAh/g. This potential is approximately fully utilized by modern lithium ion cells using pure graphite anodes. There is therefore a demand for novel anode materials.

In the design of novel anode materials, a high power density is currently of primary concern, with a high cycle stability of the material being of secondary concern. To be used in the automotive field, a lithium cell should have a high current density and thermal stability as well as a cycle stability of approximately 3000 cycles.

SUMMARY OF THE INVENTION

The subject matter of the present invention is an anode material or a material for a negative electrode for a galvanic element, in particular a lithium ion cell, which includes nanofibers made of a metal, a metal alloy, a carbon-metal oxide composite material, a carbon-metal composite material, a carbon-metal alloy composite material, a conductive polymer, a polymer-metal composite material, a polymer-metal alloy composite material or a composite material thereof.

Within the scope of the present invention, nanofibers are understood to be fibers having an average fiber diameter of ≤1000 nm and having an average aspect ratio greater than 200:1. The aspect ratio is understood here to be the ratio of the fiber length to the fiber diameter.

The term "carbon" within the scope of the present invention is understood to refer to modifications of (pure) carbon, in particular carbon modifications which are obtainable by pyrolysis. Carbon compounds such as polymers in which carbon is bonded to other elements, for example, hydrogen, are not understood to be covered by the term "carbon" within the scope of the present invention.

Such nanofibers may advantageously have a high electrical conductivity. In addition to their intrinsic high electrical conductivity, nanofibers may definitely improve the internal conductivity of the anode material since nanofibers have a large surface area due to their large aspect ratio and therefore they establish particularly good electrical contact with active material situated in, on or between the nanofibers and they are able to conduct current to such active material particularly well and discharge it from such material. Furthermore, such nanofibers are capable of binding well to anodic current conducting materials such as copper. In addition, the electrolyte is able to diffuse very well through a netting or a nonwoven or a network of such nanofibers. It is thus possible to achieve high current densities advantageously. In addition, the nanofibers are capable of compensating for volume expansions during lithium insertion, which has an advantageous effect on cycle stability and thermal stability.

For example, the nanofibers may have an average diameter in the range of ≥5 nm to ≤1000 nm, in particular from ≥50 nm to ≤1000 nm, for example, from ≥50 nm to ≤200 nm and/or they may have an average fiber length of more than 1 cm, for example, more than 10 cm. If necessary, the nanofibers may have an average fiber length of several meters or several hundred meters or even several kilometers. The average aspect ratio of the nanofibers may be greater than 500:1 in particular, for example, greater than 1000:1 or greater than 5000:1 or greater than 10,000:1. The nanofibers may be produced by electrospinning in particular.

Within the scope of one specific embodiment, the anode material includes the nanofibers as a nanofiber netting and/or nanofiber nonwoven and/or nanofiber network. In this way a three-dimensional porous nanofiber anode structure having a large surface area may be advantageously manufactured. The porosity of the nanofiber netting or nanofiber nonwoven or nanofiber network may advantageously be up to 95 vol %. Large pore spaces between the individual nanofibers may be advantageously readily accessible for solvents and electrolytes. Furthermore, this netting/nonwoven/network is also an electrically conductive porous nanonetwork, which may advantageously act as a three-dimensional enlargement of the current conductor.

Within the scope of a further specific embodiment, the nanofibers contain a lithiatable material. In particular the metal or the metal alloy or the metal oxide of the nanofibers or of the composite material of the nanofibers may be lithiatable.

A lithiatable material, in particular a lithiatable metal or a lithiatable metal alloy or a lithiatable metal oxide or lithiatable nanoparticles within the scope of the present invention may be understood to mean in particular a material, in particular a metal or a metal alloy or a metal oxide and or lithiatable nanoparticles into which lithium may be inserted or incorporated.

Examples of lithiatable metals and lithiatable metal alloys include silicon, tin and nickel-tin alloys.

Lithium may be inserted into silicon and disinserted according to the following reaction equations:

$$Si + 4{,}4Li^+ + 4{,}4e^- \rightarrow L_{4{,}4}Si$$

$$L_{4{,}4}Si \rightarrow Si + 4{,}4Li^+ + 4{,}4e^-$$

Lithium may be inserted into tin and disinserted, in particular according to the following reaction equations:

$$Sn + 4{,}4Li^+ + 4{,}4e^- \rightarrow L_{4{,}4}Sn$$

$$L_{4{,}4}Sn \rightarrow Sn + 4{,}4Li^+ + 4{,}4e^-$$

Lithium may be inserted into a nickel-tin alloy during the first charging of the system, in particular according to the following reaction equations:

$$Ni_3Sn_4 + 17{,}6Li^+ + 17{,}6e^- \rightarrow 4L_{4{,}4}Sn + 3Ni$$

During the first charging of the system, an irreversible restructuring of the metallic phase takes place in particular in that nickel atoms, which formerly functioned as placeholders, are replaced by lithium atoms with reduced swelling. From this irreversible conversion, there results in particular a porous structure which may buffer the changes in volume during the uptake or release of lithium. The subsequent discharging or charging processes then take place in accordance with the reaction equations explained in conjunction with tin. The nickel displaced from the alloy may function as a contact mediator.

Examples of lithiatable metal oxides include $SnO_2$, $Fe_3O_4$, $Fe_2O_3$ and $TiO_2$. A further example of a lithiatable material is carbon.

In addition to the electrical conductivity properties described above, the lithium insertion capacity and thus the total capacity, the cycle stability and thermal stability of the galvanic element may be improved by nanofibers made of a lithiatable metal, a lithiatable metal alloy, a carbon-metal oxide composite material with a lithiatable metal oxide, a carbon metal composite material with a lithiatable metal, a carbon-metal alloy composite material with a lithiatable metal alloy, a polymer metal composite material with a lithiatable metal, a polymer metal alloy composite material with a lithiatable metal alloy or composite materials thereof. Due to the high aspect ratio of the nanofibers, volume expansion effects during lithium insertion are negligibly small.

Within the scope of a further specific embodiment, the nanofibers are formed from a lithiatable metal or a lithiatable metal alloy.

Within the scope of a further specific embodiment, the nanofibers are formed from silicon, tin or a nickel-tin alloy. Capacities of up to approximately 4200 mAh/g in the case of silicon and up to approximately 990 mAh/g in the case of tin may advantageously be achieved by such an anode material.

Within the scope of a further specific embodiment, the nanofibers are formed from a polymer-metal or polymer-metal alloy composite material or hybrid material. A lithiatable metal, in particular silicon or tin or a lithiatable metal alloy, in particular a nickel-tin alloy, may also be used there. An electrically conductive polymer may be used as the polymer.

Within the scope of a further specific embodiment, the nanofibers are formed from a carbon-metal oxide composite material. A lithiatable metal oxide or a mixture of several lithiatable metal oxides may be also used here. This has the advantage that both the carbon and the lithiatable metal oxide are capable of inserting lithium and that a high lithium insertion capacity is achievable. For example, $Fe_3O_4$, $Fe_2O_3$, $TiO_2$, $SnO_2$ and combinations thereof may be used as the metal oxide. Such carbon-metal oxide composite materials may be manufactured for example, by pyrolyzing of a polymer nanofiber, for example, a polyacrylonitrile nanofiber including a metal salt and obtained by electrospinning, for example. The polymer may be converted into carbon and optionally the metal salt may be converted into a metal oxide, for example $Fe_3O_4$, by pyrolysis. The cohesion of the nanofibers formed from the composite material may advantageously be increased by the carbon of the composite material and their current conductivity may be improved.

Within the scope of a further specific embodiment, the nanofibers are formed from a carbon-metal or a carbon-metal alloy composite material. A lithiatable metal or a lithiatable metal alloy may be also used here. This has the advantage that both the carbon and the lithiatable metal or the lithiatable metal alloy are capable of inserting lithium and a high lithium insertion capacity may be achieved. Silicon or tin may be also used as the metal here and a nickel-tin alloy may be used as the metal alloy. Such carbon-metal and carbon-metal alloy composite material nanofibers may be manufactured by pyrolyzing of polymer nanofibers, for example, polyacrylonitrile nanofibers including metal salts and obtained by electrospinning, for example. The polymer may be converted by pyrolysis into carbon, and optionally the metal salt may be converted to a metal or a metal alloy. The cohesion of the nanofibers formed from the composite material may also advantageously be increased by the carbon of the composite material and its current conductivity may be improved.

Within the scope of a further specific embodiment, the nanofibers are formed from a conductive polymer. The term "polymer" may be understood in particular to mean that the polymer may include one or two or more polymer species and optionally additives. Such nanofibers may be coated with a lithiatable material.

Within the scope of a further specific embodiment, the nanofibers have a coating of a lithiatable material. Thus the active surface area available for lithium insertion and thus the capacity and current density may be increased advantageously by a multiple. The nanofibers may be covered or sheathed or coated essentially completely with the coating. "Essentially" here means that the surface areas of a nanofiber which come in direct contact with another nanofiber or another partial area of the same nanofiber may not be covered or coated with the coating. This may occur, for example, if the nanofibers are already in contact before the coating is formed.

The coating of the nanofibers may be produced electrochemically or in the absence of outside current, for example, by electrophoretic deposition, nanoparticle deposition and/or vacuum methods such as physical or chemical vapor phase deposition (PVD: physical vapor deposition; CVD: chemical vapor deposition).

For example, the nanofibers may be formed from a non-lithiatable material, for example, copper or a conductive polymer and may have a coating of a lithiatable material or the nanofibers may be formed from a first lithiatable material and may have a coating of a second lithiatable material which is different from the first.

Within the scope of a further specific embodiment, the nanofibers have a coating of silicon, tin or a nickel-tin alloy.

Within the scope of a further specific embodiment, the nanofibers have a coating with an average layer thickness in the range of $\geq 5$ nm to $\leq 3$ µm, for example, from $\geq 50$ nm to $\leq 3$ µm. The optimal layer thickness may depend on the selected system. It should therefore be coordinated with the system and should not be too large so as to avoid stress cracks due to swelling during cyclization.

Within the scope of a further specific embodiment, the space between the nanofibers is filled with an aerogel, in particular an electrically conductive aerogel. The electrical conductivity of the anode material may be further increased in this way, in particular since the electron transport takes place over only short distances to the next nanofiber and from there to the current conductor with good electrical conductivity.

Within the scope of a further specific embodiment, the aerogel includes lithiatable nanoparticles. The total capacity may thus advantageously be increased further. The lithiatable nanoparticles may be fixed in the pores of the aerogel. During the insertion of lithium, the nanoparticles may advantageously expand within the pores, whereby a volume expansion of the overall system may be advantageously compensated. Within the scope of this specific embodiment, the nanofibers may be formed from a lithiatable material as well as from a non-lithiatable material, for example, copper or an electrically conductive polymer. The nanofibers may be formed from a lithiatable material. Thus the lithium insertion capacity may be advantageously optimized.

Within the scope of a further specific embodiment, the aerogel includes nanoparticles of a lithiatable metal or a lithiatable metal alloy. The aerogel may include lithiatable nanoparticles of a lithiatable metal or a lithiatable metal alloy, which is selected from the group including silicon, tin, nickel-tin alloys and mixtures thereof.

The aerogel may be an aerogel on an organic basis or an aerogel on an inorganic basis. For example, the aerogel may be a carbon-based aerogel, but it is equally possible for the aerogel to be an inorganic aerogel.

To improve the electrical conductivity, i.e., the internal conductivity, the aerogel may additionally contain electrically conductive nanoparticles, for example, doped nanoparticles and/or conductive carbon. In particular an inorganic aerogel may contain electrically conductive nanoparticles, for example, doped nanoparticles and/or conductive carbon.

With regard to additional features and advantages, reference is herewith made explicitly to the explanations in conjunction with the galvanic element according to the present invention, the method according to the present invention and the description of the figures.

A further subject matter of the present invention is a galvanic element, in particular a lithium ion cell including an anode material according to the present invention.

The nanofibers of the anode material may be electrically and mechanically connected to the anodic current conductor at least in part. This may be ensured, for example, by the fact that the nanofibers of the anode material are manufactured directly on the anodic current conductor, for example, made of copper, in particular by electrospinning. It is thus possible to advantageously improve the binding of the nanofibers to the current conductor and thus to improve the current conductivity of the galvanic element. In particular the galvanic element may have an anode (negative electrode), a cathode (positive electrode) and a separator, the anode including the anode material according to the present invention.

With regard to additional features and advantages, reference is herewith made explicitly to the explanations in conjunction with the anode material according to the present invention, the method according to the present invention and the description of the figures.

A further subject matter of the present invention is a method for manufacturing an anode material according to the present invention and a galvanic element according to the present invention.

Within the scope of one specific embodiment of the method, in particular for manufacturing nanofibers from a metal, a metal alloy, a conductive polymer, a polymer-metal composite material or a polymer-metal alloy composite material, the method includes the method step:
  electrospinning of nanofibers from a material which includes at least one metal salt convertible into a metal or a metal alloy and/or at least one electrically conductive polymer or one polymer precursor convertible into an electrically conductive polymer.

Conversion of the metal salt into a metal or a metal alloy or conversion of the polymer precursor into the polymer may take place in particular by heating the nanofibers. Within the scope of this specific embodiment, the heating of the nanofibers may take place in such a way that the metal salt is indeed converted into the metal or metal alloy or the polymer precursor is indeed converted into the polymer, but the polymer is not converted into carbon.

Within the scope of a further specific embodiment of the method, in particular for manufacturing nanofibers from a carbon-metal oxide composite material, a carbon-metal composite material or a carbon-metal alloy composite material, the method includes the method steps:
  electrospinning nanofibers from a material including at least one metal salt convertible into a metal oxide or a metal or a metal alloy and at least one polymer and one polymer precursor convertible into a polymer, and
  heating, in particular pyrolyzing of the nanofibers in such a way that the polymer is converted into carbon.

Within the scope of this specific embodiment, the polymer may include polyacrylonitrile or a polyacrylonitrile precursor.

In electrospinning, it is possible to manufacture a plurality of nanofibers at the same time.

A nanofiber netting or a nanofiber nonwoven or a nanofiber network may be created directly by electrospinning.

However, it is also possible for the method to include a further method step:
  processing the nanofibers to form a nanofiber netting or a nanofiber nonwoven or a nanofiber network.

Within the scope of a further specific embodiment, a current conductor is used as the electrode in electrospinning. The nanofibers may thus be spun directly on the current conductor, so that the bond of the nanofibers to the current conductor and thus the current conductivity may be improved advantageously. Likewise a nanofiber netting or a nanofiber nonwoven or a nanofiber network may be formed from the fibers.

Within the scope of a further specific embodiment, the method includes the method step:
  coating the nanofibers with a lithiatable material.

The coating of the nanofibers may take place, for example, electrochemically or without external power, for example, by electrophoretic deposition, nanoparticle deposition and/or vacuum methods such as physical or chemical vapor phase deposition (PVD: physical vapor deposition; CVD: chemical vapor deposition).

Within the scope of a further specific embodiment, the method includes the method step:
  filling the space between the nanofibers with an aerogel precursor, which includes a lithiatable nanoparticle convertible into an aerogel.

The aerogel may be manufactured by a sol-gel process. Fundamentally the aerogel precursor and the aerogel may be based on an organic basis as well as on an inorganic basis. For example, an organic or a carbon-based aerogel may be manufactured by initially gelling a resorcinol-formaldehyde mixture, optionally drying and then tempering it, for example. After temperature regulation, a porous cross-linked, electrically conductive and lithiatable carbon-based aerogel may be obtained from the aerogel precursor, lithiatable nanoparticles optionally being fixed in the pores thereof, these nanoparticles being able to swell on insertion of lithium into the porous structure without causing damage to or decontacting of the matrix.

The aerogel precursor and the aerogel may include lithiatable nanoparticles. In particular the aerogel precursor, i.e., the aerogel, may contain nanoparticles of a lithiatable metal or a lithiatable metal alloy, in particular selected from the group including silicon, tin, nickel-tin alloys and mixtures thereof.

In addition, the aerogel precursor and the aerogel may include electrically conductive, for example, doped nanoparticles and/or conductive carbon to improve the electrical conductivity of inorganic aerogels, for example.

In addition, it is possible to introduce lithiatable nanoparticles, for example nanoparticles of silicon, tin and/or a nickel-tin alloy subsequently into the pores of the aerogel by a temper process and fix them there.

With regard to additional features and advantages, reference is herewith made explicitly to the explanations in conjunction with the anode material according to the present invention, the galvanic element according to the present invention and the description of the figures.

Additional advantages and advantageous embodiments of the subject matters according to the present invention are illustrated by the drawings and explained in the following description. It should be pointed out that the drawings have only a descriptive character and are not intended to restrict the present invention in any way.

BRIEF DESCRIPTION OF THE DRAWINGS

FIG. 4b shows an enlarged detail of the anode material shown in FIG. 4a.

DETAILED DESCRIPTION

Figure 1A:
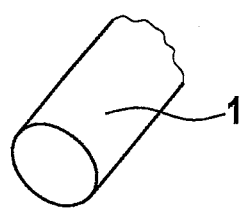
FIG. 1a shows a schematic perspective view of a lithiatable metallic nanofiber.
Figure 1B:
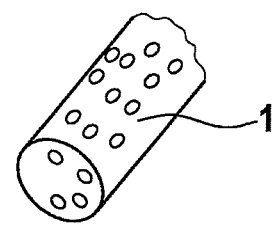
FIG. 1b shows a schematic perspective view of a lithiatable nanofiber made of a carbon-metal oxide composite material.

FIGS. 1a and 1b illustrate two different specific embodiments of lithiatable nanofibers 1, FIG. 1a showing a lithiatable metallic nanofiber 1 made of silicon, tin or a nickel-tin alloy, for example, and FIG. 1b showing a lithiatable nanofiber 1 made of a carbon-metal oxide composite material, for example, with $Fe_3O_4$ as the lithiatable metal oxide. Nanofibers of a carbon-metal oxide composite material may be manufactured, for example, by initially electrospinning nanofibers from a material including at least one metal salt convertible into a metal oxide and at least one polymer or a polymer precursor convertible into a polymer and then heating the nanofibers, in particular pyrolyzing them, in such a way that the metal salt is converted into a lithiatable metal oxide and the polymer is converted into carbon. For example, polyacrylonitrile may be used as the polymer.

Figure 2:
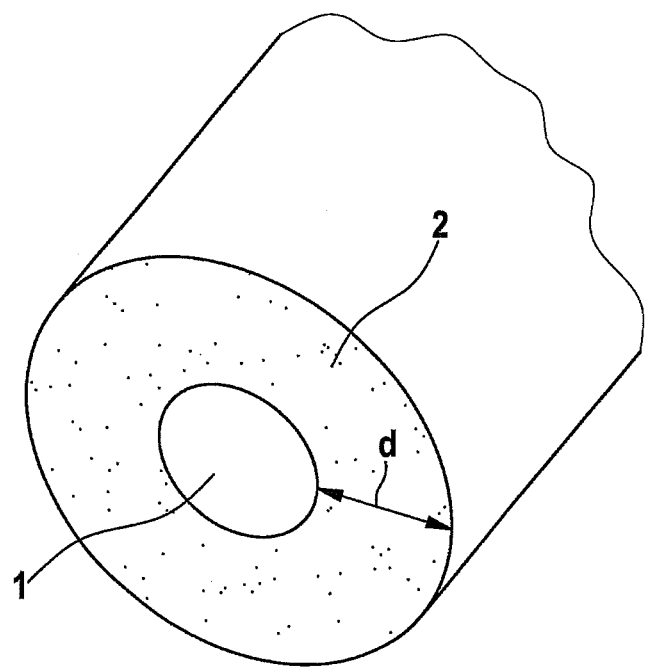
FIG. 2 shows a schematic perspective view of a nanofiber having a coating of a lithiatable material.

FIG. 2 illustrates another specific embodiment of a nanofiber 1 having a coating 2 having an average layer thickness d of a lithiatable material, for example, silicon, tin or a nickel-tin alloy. Nanofiber 1 itself may be formed from a nonlithiatable material, for example copper or an electrically conductive polymer within the scope of this specific embodiment.

Figure 3:
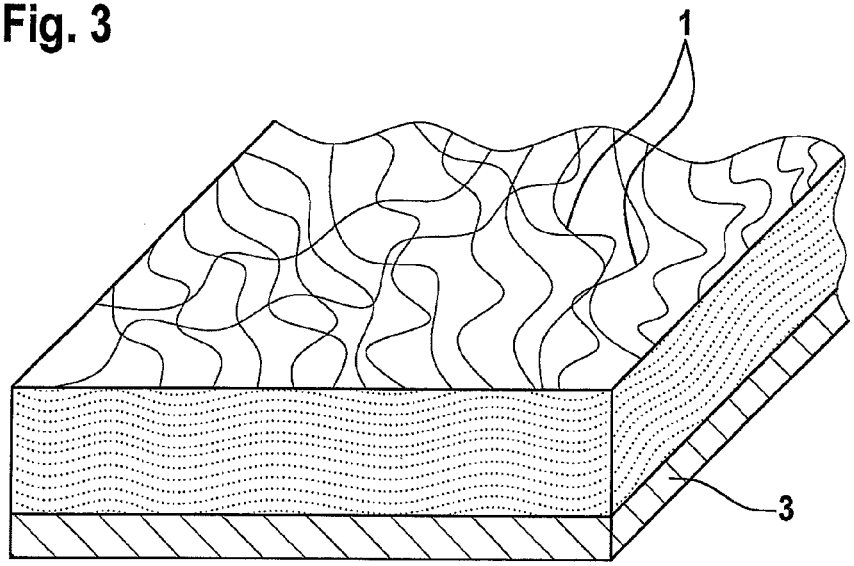
FIG. 3 shows a schematic perspective view of a nanofiber netting or a nanofiber nonwoven or a nanofiber network on an anodic current conductor.

FIG. 3 illustrates the fact that lithiatable nanofibers 1 may be present in the form of a nanofiber netting or a nanofiber nonwoven or a nanofiber network. This may be accomplished, for example, by manufacturing the nanofibers by electrospinning, a current conductor 3 of the anode to be manufactured or of the galvanic element to be manufactured being used as the electrode.

Figure 4A:
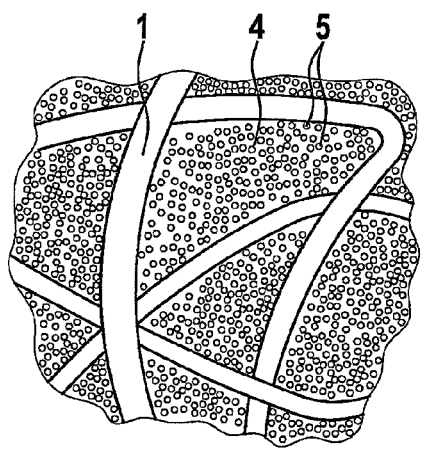
FIG. 4a shows a schematic cross section through an anode material which includes a nanofiber netting or a nanofiber nonwoven or a nanofiber network of lithiatable nanofibers, the interspaces between the nanofibers being filled with an aerogel and lithiatable nanoparticles being situated in the pores of the aerogel.
Figure 4B:
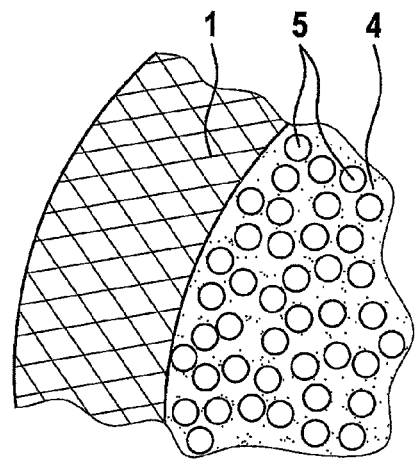

FIGS. 4a and 4b show another specific embodiment of an anode material according to the present invention, within the scope of which the anode material includes a nanofiber netting or a nanofiber nonwoven or a nanofiber network of lithiatable nanofibers 1, for example, of silicon, tin or a nickel-tin alloy, the interspaces between nanofibers 1 being filled with an aerogel 4, for example, a carbon-based aerogel, lithiatable nanoparticles 5, for example, made of silicon, tin or a nickel-tin alloy being situated in the pores of aerogel 4.

What is claimed is:

1. An anode material for a galvanic element, comprising:
nanofibers that are electrically conductive and made of a metal, a metal alloy, a carbon-metal oxide composite material, a carbon-metal composite material, a conductive polymer, a polymer-metal composite material, a polymer-metal alloy composite material or a composite material thereof, wherein:
each nanofiber includes a coating of silicon, tin or a nickel-tin alloy,
the coating forms a layer having a defined thickness,
spaces between the nanofibers are filled with an aerogel, and
the aerogel includes lithiatable nanoparticles located within pores of the aerogel.

2. The anode material of claim 1, wherein the anode material includes the nanofibers as at least one of a nanofiber netting, a nanofiber nonwoven, and a nanofiber network.

3. The anode material of claim 1, wherein the nanofibers include a lithiatable material.

4. The anode material of claim 1, wherein the nanofibers are formed from silicon, tin or a nickel-tin alloy.

5. The anode material of claim 1, wherein the coating has an average layer thickness in a range from ≥5 nm to ≤3 μm.

6. The anode material of claim 1, wherein the lithiatable nanoparticles are fixed in the pores of the aerogel such that the nanoparticles expand in volume upon insertion of lithium into the anode material, thereby preventing damage to a nanofiber network formed by the nanofibers and the aerogel.

7. The anode material of claim 1, wherein the lithiatable nanoparticles are made of a lithiatable metal or a lithiatable metal alloy from silicon, tin, nickel-tin alloys or mixtures thereof.

8. The anode material of claim 1, wherein the galvanic element includes a lithium ion cell.

9. The anode material of claim 1, wherein the nanofibers are formed of an electrically conductive, nonlithiatable material coated by the coating of silicon, tin or nickel-tin alloy.

10. The anode material of claim 9, wherein the nonlithiatable material is one of copper and a polymer.

11. The anode material of claim 1, wherein the nanofibers are made of the metal alloy.

12. The anode material of claim 1, wherein the nanofibers are made of the conductive polymer.

13. The anode material of claim 1, wherein the nanofibers are made of the polymer-metal composite material.

14. The anode material of claim 1, wherein the nanofibers are made of the polymer-metal alloy composite material.

15. A galvanic element, comprising:
a lithium ion cell including an anode material;
wherein:
the anode material includes nanofibers that are electrically conductive and made of a metal, a metal alloy, a carbon-metal oxide composite material, a carbon-metal composite material, a conductive polymer, a polymer-metal composite material, a polymer-metal alloy composite material or a composite material thereof,
each nanofiber includes a coating of silicon, tin or a nickel-tin alloy,
the coating forms a layer having a defined thickness,
spaces between the nanofibers are filled with an aerogel, and
the aerogel includes lithiatable nanoparticles located within pores of the aerogel.

* * * * *